Sept. 29, 1953
J. N. GRABER
2,653,344
TRAVERSE ROD AND SUPPORTING BRACKET
Filed July 15, 1949
3 Sheets-Sheet 1
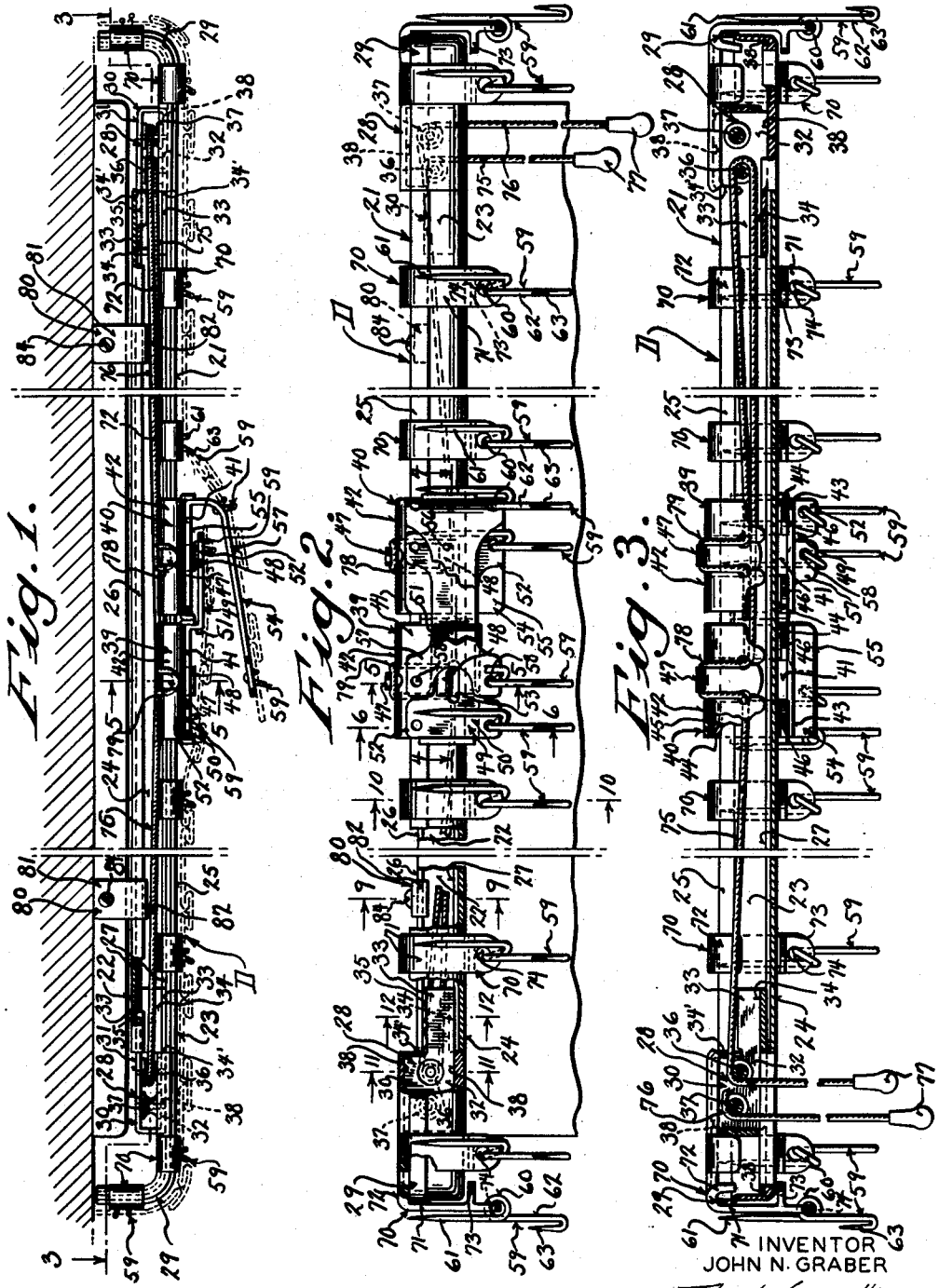
INVENTOR
JOHN N. GRABER
BY
ATTORNEYS Sept. 29, 1953   J. N. GRABER   2,653,344
TRAVERSE ROD AND SUPPORTING BRACKET
Filed July 15, 1949   3 Sheets-Sheet 2
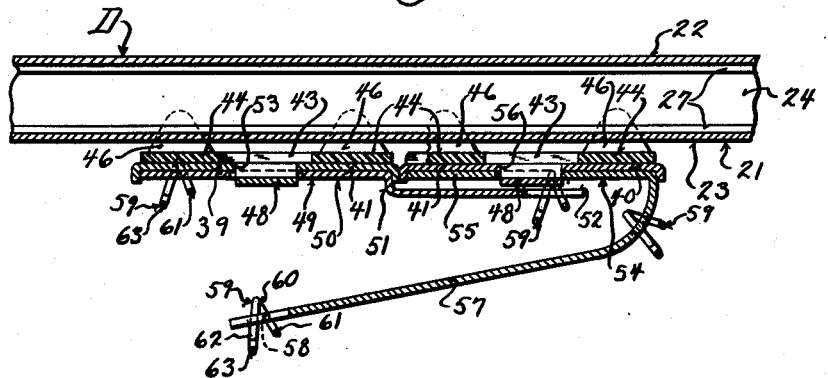
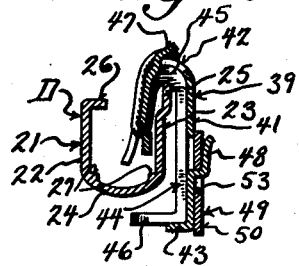
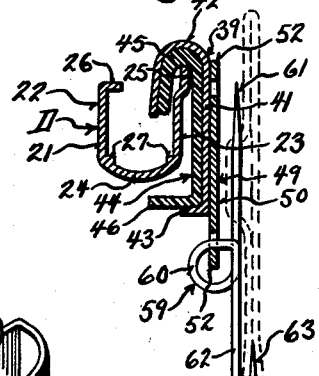
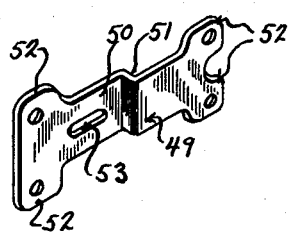
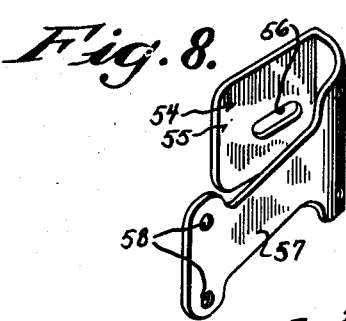
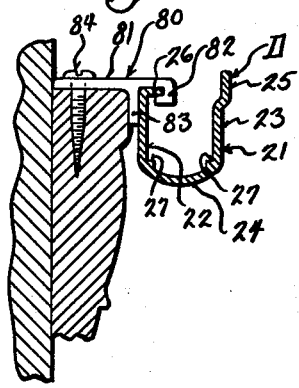
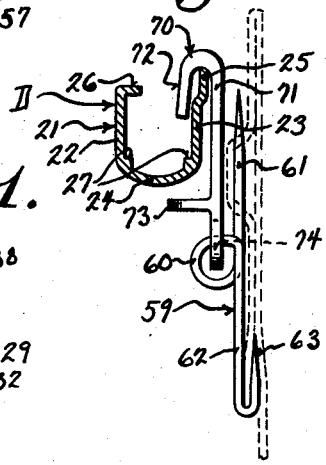
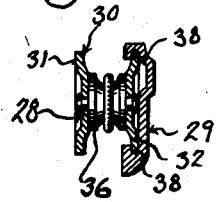
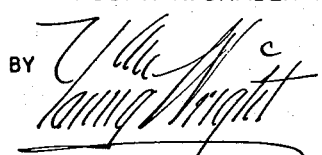
INVENTOR
JOHN N. GRABER
BY
ATTORNEYS Sept. 29, 1953  J. N. GRABER  2,653,344
TRAVERSE ROD AND SUPPORTING BRACKET
Filed July 15, 1949  3 Sheets-Sheet 3
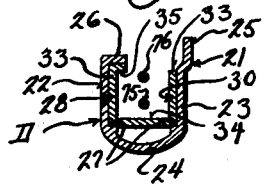
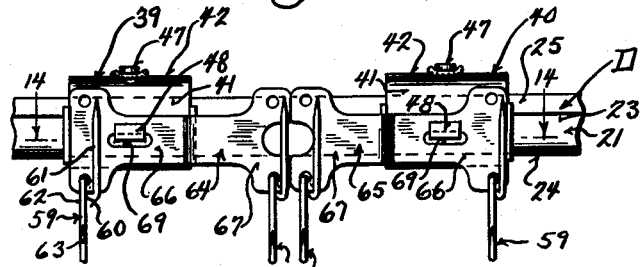
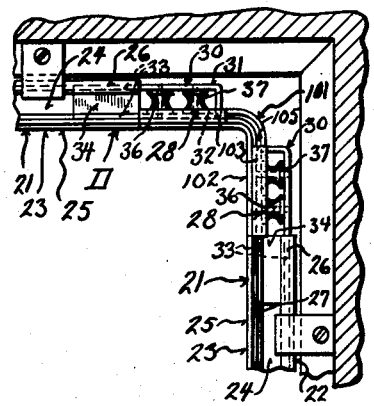
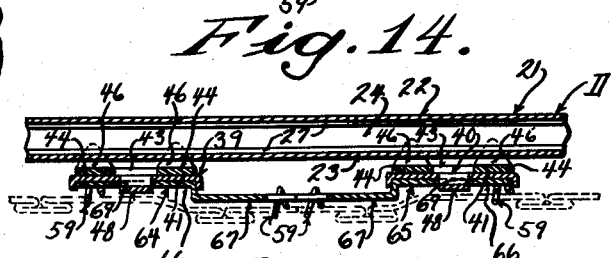
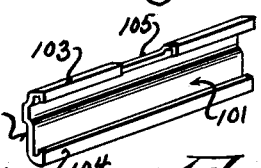
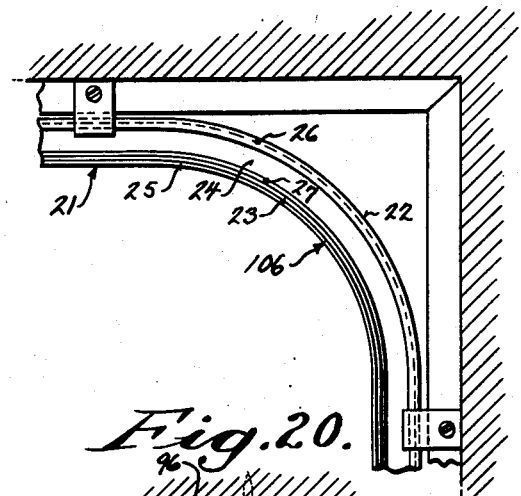
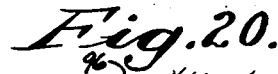
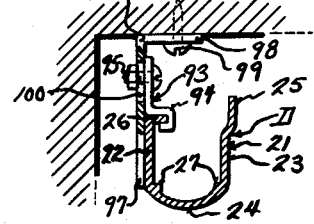
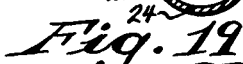
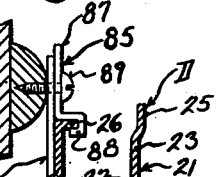
INVENTOR
JOHN N. GRABER
BY
ATTORNEYS Patented Sept. 29, 1953

2,653,344

UNITED STATES PATENT OFFICE 2,653,344

TRAVERSE ROD AND SUPPORTING BRACKET

John N. Graber, Middleton, Wis., assignor to The Graber Company, Middleton, Wis., a partnership Application July 15, 1949, Serial No. 104,927

3 Claims. (Cl. 16—94)

1

This invention appertains to drapery rods and more particularly to a novel traverse rod and supports therefor.

An object of the invention is to provide a novel drapery rod, which will efficiently and harmoniously blend in with the contour of the woodwork of a window and door casing.

Another further object of the invention is to provide novel means cooperating with the configuration of the rod for supporting the rod at desired points throughout its length and on various characters of woodwork or plaster, the entire construction being such that the rod can be effectively and conveniently carried beyond the ends of a window or door opening and over a wall without special fittings, to give a desired wide picture window effect.

A still further object of the invention is to provide a novel traverse rod and fixtures therefor, which will permit draperies to be hung with the most exacting lines by a layman and close to a window or wall, if such should be desired.

A still further object of the invention is to provide means whereby the rod can be effectively extended around corners of rooms to permit the use of draperies on corner windows and the like.

With these and other objects in view, the invention consists in the novel construction and formation of parts, as will be hereinafter more specifically described and claimed and illustrated in the accompanying drawings, in which drawings:

Figure 1, is a top plan view illustrating the improved traverse rod applied to the top of a window frame, the master slides being shown in their closed position for carrying the adjacent edges of draperies in overlapping relation, parts of the figure being shown in section.

Figure 2, is a front elevational view of the improved traverse rod secured to the top of a window frame and with the master slides in their close position, parts of the figure being shown broken away and in section to illustrate structural detail.

Figure 3, is a longitudinal sectional view through the traverse rod taken on the line 3—3 of Figure 1, looking in the direction of the arrows.

Figure 4, is a fragmentary horizontal sectional view taken on the line 4—4 of Figure 2, looking in the direction of the arrows illustrating the novel construction of the master slides, the view being taken on a greater scale than Figures 1, 2 and 3.

Figure 5, is a transverse sectional view through the traverse rod and one of the master slides

2 taken on the line 5—5 of Figure 1, looking in the direction of the arrows.

Figure 6, is a view similar to Figure 5, but taken on the line 6—6 of Figure 2, looking in the direction of the arrows.

Figure 7, is a detail perspective view of a part of one of the master slides.

Figure 8, is a perspective view of a part of the other master slide.

Figure 9, is a fragmentary transverse sectional view taken on the line 9—9 of Figure 2, looking in the direction of the arrows illustrating one of the novel supports for permitting the connection of the rod to the top of a window casing or molding.

Figure 10, is a transverse sectional view through the traverse rod taken on the line 10—10 of Figure 2, looking in the direction of the arrows and illustrating one of the intermediate slides in end elevation.

Figure 11, is a transverse sectional view taken on the line 11—11 of Figure 1, looking in the direction of the arrows illustrating a part of one of the pulley assemblies and an end return or elbow connected therewith.

Figure 12, is a detail transverse sectional view taken on the line 12—12 of Figure 2, looking in the direction of the arrows and illustrating the means of associating one of the pulley assemblies therewith.

Figure 13, is a fragmentary front elevational view of a drapery rod showing a slightly modified form of master slide connected therewith.

Figure 14, is a fragmentary longitudinal sectional view taken on the line 14—14 of Figure 13, looking in the direction of the arrows.

Figure 15, is a detail perspective view of a connector for the ends of drapery rods of a type which can be bent into form for use on corners.

Figure 16, is a fragmentary top plan view showing the use of one of the connectors, the connector being bent into form to agree with the shape of the corner.

Figure 17, is a fragmentary top plan view illustrating a drapery rod bent into a gradual curve for use in corners.

Figure 18, is a detail transverse sectional view through the drapery rod illustrating the use of one of the novel supports on half-round molding.

Figure 19, is a view similar to Figure 18, and illustrating a novel support for the rod for use flush against woodwork or plaster.

Figure 20, is a view similar to Figures 18 and 19, but illustrating the use of a support for a rod from a ceiling or the like.

Referring to the drawings in detail, wherein similar reference characters designate corresponding parts throughout the several views, the letter D generally indicates the novel drapery rod and its accessories and the same includes a rod proper 21. The rod proper 21 is formed from extruded aluminum or any other desired material finished in any desired way to produce an attractive appearance and to harmonize with the woodwork or color scheme of a room. The rod is of a substantially U-shape in cross section and includes a rear wall 22, a front wall 23 and a bottom arcuate connecting wall 24. It is to be noted that the front wall 23, extends above the rear wall 22 and is provided with an offset flange 25, to give an ornamental effect. The rear wall 22 has formed on its upper edge an inwardly directed horizontal flange 26, for a purpose, which will later appear. Shoulders 27, can be provided on the inner face of the rod proper 21 at the points of juncture of the rear wall 22 and the front wall 23, with the bottom wall 24, and these shoulders form seats, for the end pulley assemblies 28, which will be later set forth (see Figure 12).

The rod proper 21 is cut in the desired length to agree with a particular window or door installation and, as intimated, the ends of the rod receive the pulley assemblies 28 and the outer terminals of the pulley assemblies in turn receive and support the end returns or elbows 29 for the rod.

Referring more particularly to the pulley assemblies 28, each of the same includes a block structure 30 having spaced parallel rear and front walls 31 and 32. The forward ends of these walls are reduced in height to provide extensions 33 and stop shoulders 34'. The extensions 33 are connected by a bottom wall 34, which slides on the shoulders 27. The rear extension wall has formed on its upper edge an inwardly directed right angularly extending flange 35 which slides under the rod flange 26. The extension is slid into the rod and until the shoulder 34' abuts the rod, and as is clearly shown in Figures 1, 2, 3. The walls 31 and 32 rotatably support pulley rollers 36 and 37, and it is to be noted that the roller 37 is positioned slightly above the inner roller 36.

The end returns or elbows 29 are preferably of a C-shape in cross section and each includes inwardly directed upper and lower guide flanges or tracks 38, which slide over the front wall 32 of the pulley blocks. It is to be noted that the curved ends of the returns 29 extend back toward the window or door casing, as the case may be. The returns are shaped to conform to the general configuration of the outer or front wall 23 of the rod proper so as to effectively harmonize therewith.

Associated with the rod are the novel master guides or slides 39 and 40 for the draperies, adjacent to their meeting edges. These guides or slides form an important part of the invention. The master slides 39 and 40 each include a guide bracket fabricated from metal and include a front plate 41 having formed on its upper edge a bent down arcuate guide flange 42 for engaging over the offset flange 25 of the front wall of the rod and the lower edge of the plate 41 has formed thereon, the inwardly directed right angularly extending bottom flange 43. Fitted within the guide bracket is an anti-friction slide bearing 44 preferably formed from plastic and this slide bearing has formed on its upper edge the arcuate curved flange 45, which conforms to the flange 42 and the lower edge of the slide bearing has formed thereon at spaced points inwardly directed bearing tongues 46. Hence, the master slides 39 and 40 have an inner bearing face of plastic which eliminates noise incident to the sliding thereof along the length of the rod.

Each flange 42 intermediate its ends has struck out therefrom a tongue or hook 47 for the pull cords, as will be later set forth. Likewise, each plate 41 has struck out therefrom an upwardly directed hook or lip 48 for detachably supporting different types of drapery carrying plates which will be later set forth. The drapery carrying plate 49 for the master slide 39 (see Figure 7) includes a body 50 having an offset 51 intermediate its ends so that a part thereof will be in a different vertical plane than the body and the ends of the plate 49 carry apertured ears 52. A slot 53 is formed in the drapery plate 49 for receiving the hook or lip 48, and obviously, by this construction the drapery carrying plate 49 can be quickly detachably secured to the master slide 39. The offset part 51 of the plate extends beyond the master slide or guide 39, as clearly shown in Figures 1 and 4.

Detachably associated with the master slide or guide 40, is a drapery supporting plate 54 and the same includes a body portion 55 having a slot 56 for receiving the hook or lip 48 of this master guide, so as to permit the attachment of the plate 54 therewith. Formed on the outer end of the body 55 is the bent back arm 57 and this arm is adapted to extend over the offset extension 51 of the plate 49. The arm adjacent to its opposite ends is provided with pairs of apertures 58, for a purpose which will later appear.

In associating the draperies with the master slides, the desired types of drapery carrying plates are associated with the master slides, such as just described, and drapery supporting hooks 59 are associated with selected apertures in the ears 52 of plate 49 and in selected apertures in the arm 57. The pins can be of the type commonly found on the open market, but are preferably of the character shown in the drawings. These drapery pins 59 include a coiled bight portion 60, an upwardly extending pointed shank 61 and a depending leg 62 having a bent back pointed hook 63. If desired the inner face of the drapery adjacent to its head can have sewed thereto reinforcing tabs, or the pointed shank 61 can be inserted directly through the hem of the drape head, as can be the pointed hook 63. With the particular type of hook shown, the heading is held straight and against drooping. With the edges of the drapery carried by the master slide, and when the master slides are in their closed position, as shown in Figures 1 to 4, inclusive, and with the arm 57 overlying the offset 51, the edges of the drapery will be carried in an overlapping position, which will effectively prevent light leakage.

As intimated above, different characters of drapery carrying plates 39 and 40 can be utilized with the master slides and in fact, where it is desired to have the drapery moved to an abutting, instead of an overlapping position, the position of the master guides can be reversed so that their outer instead of their inner ends will abut. In Figures 13 and 14, I have shown drapery supporting plates 64 and 65, especially designed to carry the drapes to an abutting position. These plates 64 and 65 can be of an identical construction and similar to or the same as the plate 49 and hence these plates 64 and 65 each include a body portion 66 having an offset arm 67. The ends of the plates 64 and 65 carry apertured ears 68 for the reception of the drapery pins 59. The body portion 66 of the plates 64 and 65 are slotted as at 69 for receiving the bent up hooks 48 of the master slides 39 and 40. As shown in Figures 13 and 14, the terminals of the offset arm 67 abut when the master slides are in their closed position.

In conjunction with the master slides, a plurality of novel intermediate slides 70 can be provided for supporting the drapery at the desired selected points. These slides 70 are formed from clear plastic, or any other desired material, so that the same will slide easily along the rod without noise and each of the slides 70 include an upright body plate 71 having a bent back hook 72 for engaging over the offset flange 25 of the front plate of the rod. The plate adjacent to its lower end, but spaced therefrom, is provided with an inwardly directed right angularly disposed tongue 73 and the extreme lower end of the plate is provided with an aperture 74 for receiving a pin 59. It is to be noted that the offset flange 25 spaces the major portion of the intermediate slide 71 and the master slides 39 and 40 from the rod and this eliminates friction and permits the easy working of all of the slides.

In order to open and close the draperies, a single length of pull cord is utilized and the same includes the pull or opening stretch 75 and the closing or return stretch 76. The outer ends of these stretches are trained over the rollers 36 and 37 of one pulley assembly and the ends of the stretches can be provided with knobs 77. The pull or opening stretch 75 has an intermediate part thereof looped over, as at 78, the hook or tongue 47 of the master slide 40. The intermediate part of the closing stretch 76 is looped over, as at 79, the hook 47 of the master slide 39. The stretches travel over one pulley 36 of the opposite pulley assembly which carries the terminals of the stretches. Obviously, by pulling down on the stretch 75, the master slides will be pulled in the opposite directions away from one another and by pulling down on the stretch 76, the slides will be brought toward one another. Great stress is laid on the fact that the pull cord is received wholly within the rod and as the rod is of a U-shape, the same hides the cord and consequently any slack in the cord will be retained by the rod and slack cord will not drop down over the drapes.

Novel means is provided for supporting the traverse rod at any point or points throughout the entire length thereof, and the supports are so-designed that they will not interfere with the travel of the master and intermediate slides. While all of the supports are of the same basic character, different forms thereof are provided for different types of installations. In Figures 1, 2 and 3, the traverse rod is shown connected by novel brackets 80. In Figure 9, the bracket or support 80, is illustrated on a larger scale. As shown in these figures, each support or bracket 80 includes a top plate 81 having an inwardly directed hook 82 formed on its outer end and a depending leg 83 on its lower face disposed in spaced relation to the hook. With these supports 80, the same are placed on top of a window or door frame or molding and are secured to the upper face thereof by a single screw 84. The leg 83 of each support engages the front face of the woodwork and prevents downward swinging movement of the support. The leg 83 performs another desired function as will be now set forth. After the supports have been placed on the woodwork at the desired distances apart, the rod is tilted at an angle and the inwardly directed flange 26 is inserted within the hooks 82, after which the rod is swung down back against the legs 83 and these legs 83 form a support for the rod. This effectively holds the rod in place and obviously the rod can be quickly and easily attached to or detached from the brackets or supports 80.

In Figure 18, I have shown a bracket 85, which can be conveniently used with half-round molding or other irregular surfaces. In this form the bracket includes an inner straight supporting plate 86 and a bracket arm 87. The bracket arm 87 has formed on its lower end, the outwardly directed hook 88. The hook 88 has formed on its lower end the outwardly directed hook 88. The hook 88 is spaced from the lower end of the plate 86 and the plate 86 and the bracket arm 87 are secured together and to the molding by a single screw 89. As is clearly shown in Figure 18, the plate 86 extends below the hook and when the traverse rod is placed in position with its flange 26 in the hooks 88, the rear face of the back wall 22 will engage against the plate and the traverse rod will be effectively supported.

Where it is desired to make an installation substantially flush with a wall or a door or window frame, a bracket arm 90 can be utilized. This arm 90 is similar to or the same as the bracket arm 85 and hence the arm has formed on its lower end the hook 91. The arm can be secured in place by a screw or the like 92. In this installation, the flange 26 of the rear wall 22 of the rod is inserted within the hook 91 and the outer face of the rear wall will lie against the wall or woodwork.

In Figure 20, an installation is shown, whereby the traverse rod can be secured to a ceiling or the like and in this installation, a bracket arm 93 is employed which is similar to or the same as the bracket arms 85 and 90. The bracket arm 93 also includes the hook 94 and the bracket arm is adjustably secured by means of a bolt 95 to an angle bracket 96. The angle bracket 96, includes an elongated depending vertical leg 97 and a right angularly horizontal short leg 98. The short leg is placed against the ceiling and the angle bracket is held in place by a screw or other desired type of fastening element. The bolt 95 extends through a slot 100 in the vertical leg 97 and hence the bracket arm 93 can be adjusted up and down on the leg. In this installation, the flange 26 of the drapery rod is placed in the hook 94 and the outer face of the rear wall 22 rests against the leg 97.

Great stress is laid on the fact that in all of the different types of supports utilized, the same can be associated with the rod at any point, or points, throughout its entire length and the rod can be conveniently extended beyond the sides of a door or window frame.

In the corner installations, it is desirable to use two drapery rods 21 and to connect the adjacent ends of the rods by a corner connector 101. The corner connector 101 includes a length of metal of a substantially C-shape in cross section having a front wall 102 and inwardly directed upper and lower inturned flanges or guides 103 and 104. The connector is designed to carry out the shape or configuration characteristics of the front face of the drapery rods 21. The top flange or guide 103 is cut away or notched intermediate its ends as at 105, which weakens the connector at an intermediate point. Consequently, the connector can be taken in the hands, and bent into the exact desired angle (in view of the fact that the connectors are made of soft bendable metal such as aluminum). As shown in Figure 16, the ends of the connector are bent substantially at right angles to one another and the ends thereof receive the front walls of the inner pulley assemblies. It is to be also noted at this point, that the pulley assemblies are interchangeable from one end of each rod to the other.

Attention is called to the fact that the connector 101 forms a shield for the pulley assembly and the returns or end elbows 29 likewise form an ornamental shield for the pulley assembly.

In some instances, it may be desirable to produce a wide sweeping curve around a corner so as to permit draperies to slide around the corner of a room.

In Figure 17, I have shown one of the rods bent in this large sweeping curve, as at 106.

Changes in details may be made without departing from the spirit or the scope of this invention, but what I claim as new is:

1. In a drapery installation of the type including a rod having a rear wall and a forwardly projecting substantially horizontally disposed flange; a bracket for detachably supporting the rod at any point throughout its length including a bracket arm having an outwardly directed hook, the hook including an inwardly directed bill terminating short of the arm, said arm being adapted to fit flat against a surface and said rod being associated with the bracket by tilting the rod for moving the flange into the hooks, the spacing of the bill of the hook from the arm permitting the rod to be swung back on the hook against the arm.

2. In a drapery installation of the type including a rod having a rear wall and a forwardly projecting flange on its upper edge; a bracket for detachably connecting the rod to an element having an irregular surface comprising a vertically disposed flat plate and a bracket arm having a body, and an outwardly extending hook including an inwardly directed bill extending toward but spaced from the plate, and a fastening element extending through the body portion of the bracket arm and the upper end of the plate and adapted to extend into an element having an irregular surface, the hook of the bracket receiving the flange of the rod and the rear wall of the rod being adapted to fit flat against said flat plate of the bracket.

3. In a drapery installation of the type including a rod having a rear wall and a forwardly directed flange on the upper edge thereof; a bracket for detachably securing the rod to a ceiling including an angle member having an attaching leg and a depending long leg, means for securing the attaching leg to a ceiling, a bracket arm having an outwardly directed hook including an inwardly directed bill, means adjustably securing the arm to the long leg, said hook being disposed above the lower end of the long leg and said rod being connected to the bracket by moving the flange of the rod into the hook with the rear wall engaging the long leg below the hook.

JOHN N. GRABER.

References Cited in the file of this patent

UNITED STATES PATENTS

| Number | Name | Date |
|---|---|---|
| 1,070,171 | Peterson | Aug. 12, 1913 |
| 1,476,513 | Hills | Dec. 4, 1923 |
| 1,750,444 | Vallen | Mar. 11, 1930 |
| 1,895,780 | Barrett | Jan. 31, 1933 |
| 1,949,224 | Toelle | Feb. 27, 1934 |
| 1,963,821 | Beauchamp | June 19, 1934 |
| 2,231,305 | Vallen | Feb. 11, 1941 |
| 2,369,227 | Graber | Feb. 13, 1945 |

FOREIGN PATENTS

| Number | Country | Date |
|---|---|---|
| 251,328 | Switzerland | July 16, 1948 |
| 254,766 | Great Britain | July 5, 1926 |
| 324,801 | Great Britain | Feb. 6, 1930 |
| 481,967 | Great Britain | Mar. 18, 1938 |